(12) United States Patent
Jung et al.

(10) Patent No.: US 8,306,570 B2
(45) Date of Patent: Nov. 6, 2012

(54) APPARATUS AND METHOD FOR CHANGING NETWORK INTERFACES IN A MULTIACCESS MOBILE TERMINAL

(75) Inventors: Heung-Chul Jung, Suwon-si (KR); Ji-Cheol Lee, Yongin-si (KR); Sung-Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1574 days.

(21) Appl. No.: 11/366,801

(22) Filed: Mar. 3, 2006

(65) Prior Publication Data

US 2006/0218606 A1  Sep. 28, 2006

(30) Foreign Application Priority Data

Mar. 3, 2005  (KR) .................. 10-2005-0017856

(51) Int. Cl.
*H04M 1/00* (2006.01)
(52) U.S. Cl. .................. 455/552.1; 455/436; 455/452.2
(58) Field of Classification Search .............. 455/62, 455/552.1, 553.1, 435.2, 435.3, 436, 437, 455/438, 452.2; 375/240
See application file for complete search history.

(56) References Cited

U.S. PATENT DOCUMENTS

| | | | |
|---|---|---|---|
| 6,366,561 | B1 | 4/2002 | Bender |
| 6,515,974 | B1 | 2/2003 | Inoue et al. |
| 7,006,827 | B2 * | 2/2006 | Masuda et al. ............. 455/439 |
| 2002/0122465 | A1 * | 9/2002 | Agee et al. ................. 375/141 |
| 2003/0114159 | A1 * | 6/2003 | Park et al. ................. 455/436 |
| 2003/0148777 | A1 * | 8/2003 | Watanabe et al. ............ 455/458 |
| 2004/0133668 | A1 | 7/2004 | Nicholas, III |
| 2004/0174853 | A1 | 9/2004 | Saito et al. |
| 2005/0013269 | A1 * | 1/2005 | Han et al. .................... 370/328 |
| 2007/0097862 | A1 * | 5/2007 | Moon et al. ................. 370/230 |

FOREIGN PATENT DOCUMENTS

| | | |
|---|---|---|
| EP | 1 349 409 A1 | 10/2003 |
| JP | 2002-290445 A | 10/2002 |
| JP | 2004272563 A * | 9/2004 |
| RU | 2 128 886 C1 | 4/1999 |
| WO | WO 02/37888 A1 | 5/2002 |
| WO | WO 03/101044 A1 | 12/2003 |
| WO | WO 2004/028095 A1 | 4/2004 |

OTHER PUBLICATIONS

English Translation: JP 2004272563 A, Saito et al. (Sep. 30, 2004).*
Wu et al., "Mobile IPv6 Based Seamless Handoff Strategy for Heterogeneous Wireless Networks", China Data Communications, Feb. 28, 2005, pp. 65-69, No. 2.

* cited by examiner

*Primary Examiner* — Jean Gelin
(74) *Attorney, Agent, or Firm* — Roylance, Abrams, Berdo and Goodman, LLP

(57) ABSTRACT

An apparatus and method are provided for changing network interfaces in a multiaccess mobile terminal in a wireless communication system including a server for providing high-capacity data transmission service to a mobile terminal, and the terminal for receiving data from the server and supporting various network interfaces. Upon detecting handoff based on current air information received, an interface module reports a change in interface to a new air interface to an upper layer, and manages the mobile terminal such that traffic is transmitted to the new air interface. Upon receiving information on the new air interface from the interface module, a service module determines a bandwidth of the new air interface, generates a message based on the determined bandwidth, and transmits the generated message.

11 Claims, 12 Drawing Sheets

APPARATUS AND METHOD FOR CHANGING NETWORK INTERFACES IN A MULTIACCESS MOBILE TERMINAL

CROSS-REFERENCE TO RELATED APPLICATIONS

This application claims the benefit under 35 U.S.C. §119(a) of Korean Patent Application No. 10-2005-0017856 entitled "Apparatus and Method for Changing Network Interfaces in a Multiaccess Mobile Terminal" filed in the Korean Intellectual Property Office on Mar. 3, 2005, the entire disclosure of which is hereby incorporated by reference.

BACKGROUND OF THE INVENTION

1. Field of the Invention

The present invention relates generally to an apparatus and method for changing network interfaces in a mobile terminal. In particular, the present invention relates to an apparatus and method for changing network interfaces in a multiaccess mobile terminal (or a multi-interface-accessible mobile terminal) to smoothly perform application layer service using information on a new network interface during handoff of the multiaccess terminal.

2. Description of the Related Art

In general, mobile communication networks providing conventional circuit-switched voice service are divided into a Frequency Division Multiple Access (FDMA) network that divides a predetermined frequency band into a plurality of frequency channels and allocates the frequency channels to a plurality of subscribers, a Time Division Multiple Access (TDMA) network that divides a frequency channel into a plurality of time slots and allocates the time slots to a plurality of subscribers, and a Code Division Multiple Access (CMDA) network that allocates the same frequency band and the same time slot to a plurality of subscribers but allocates different codes to the subscribers according to their communication methods.

With the rapid progress of communication technologies, the up-to-date CDMA communication system, which is the typical mobile communication system, can provide not only conventional voice service but can also provide high-speed packet data service that allows subscribers to transmit large-volume digital data such as E-mails, still images, moving images, and so forth, with mobile terminals (or mobile stations).

A so-called $3^{rd}$ Generation (3G) mobile communication system for providing the high-speed packet data service generally employs the CDMA scheme, and the CDMA scheme is divided into a synchronous scheme adopted in the United States and an asynchronous scheme adopted in Europe and Japan. For example, the asynchronous scheme includes General Packet Radio Service (GPRS) and the synchronous scheme includes CDMA 2000 1x, 1x Evolution Data Only (EV-DO), and 1x Evolution of Data and Voice (EV-DV). The mobile communication systems are now under active development, directed at an International Mobile Telecommunication 2000 (IMT-2000) system, which is the synchronous next generation mobile communication system, and a Universal Mobile Telecommunication Systems (UMTS) system, which is the asynchronous next generation mobile communication system. The UMTS system is also known as a Wideband CDMA (W-CDMA) system.

A brief description of the mobile communication systems will now be made. The GPRS has developed from circuit-switched Global System for Mobile communication (GSM) to provide packet data service, and CDMA 2000 1x provides data service at a downlink data rate of 144 Kbps which is higher than a data rate of the conventional IS-95A/IS-95B networks that support data rates of 14.4 Kbps and 56 Kbps, using an IS-95C network that has evolved from the conventional IS-95A/IS-95B networks. The 1x EV-DO has evolved from CDMA 2000 1x to support a downlink data rate of about 2.4 Mbps, for transmission of large-volume digital data, and 1x EV-DV simultaneously supports voice and data services to make up for the defects of 1x EV-DO.

The IEEE 802.1x standardization group is now establishing another standard for providing wireless Internet service to subscribers with mobile terminals, and the network providing the wireless Internet service according to the IEEE 802.1x standard is commonly called a Wireless Local Area Network (WLAN). The WLAN, due to its wide transmission bandwidth, can transmit/receive a large volume of packet data through mobile terminals in a short time, and provides portable Internet service (also known as WiBro service) in which every subscriber shares channels to efficiently use the Broadband Wireless Access (BWA) network.

A scheme for providing the packet data service to the mobile terminals is roughly divided into a scheme using a 3G CDMA 2000 1x mobile communication network (hereinafter referred to as a "mobile communication network-based scheme") and a scheme using a WLAN (hereinafter referred to as a "WLAN-based scheme"). In the mobile communication network-based scheme, after a Point-to-Point Protocol (PPP) session is set up between a mobile terminal and a packet data service node (PDSN), the PDSN allocates an IP address to the mobile terminal to provide the packet service. The WLAN-based scheme allocates an IP address to a mobile terminal accessing the WLAN via an Access Point (AP), using a Dynamic Host Configuration Protocol (DHCP). Thereafter, a Home Agent (HA) and a Foreign Agent (FA) cooperate to provide the packet service to the mobile terminal.

The packet data service based on the mobile communication network and the packet data service based on the WLAN, independently operate as described above. Both networks, because they are connected to each other via an IP network such as the Internet, can simply provide network interworking service such as handoff service, using the existing network configuration and protocol configuration. The handoff service is provided to meet the user demands for the seamless packet data service and offer convenience to the service users. There is, however, still an increasing demand for studies of such technology.

With reference to FIG. 1, a description will now be made of a configuration of a general mobile communication system that provides handoff service.

FIG. 1 is a diagram illustrating a configuration of a general mobile communication system in which a mobile communication network and a WLAN are coupled to each other. For example, in FIG. 1 a CDMA 2000 1x network and an IEEE 802.1x WLAN are coupled to each other.

Referring to FIG. 1, a mobile station (MS) 110 is connected to a mobile communication network via a base station (BS) 120, or is connected to a WLAN via APs for connecting a wireless network to a wire network and an Access Point Controller (APC) for controlling packet communication (hereinafter referred to as an "AP/APC" 150), to receive packet data service. The BS 120 comprises Base Transceiver Subsystems (BTSs) and a Base Station Controller (BSC) for controlling the BTSs. A Packet Control Function (PCF) 130 controls a flow of packet data between the BS 120 and a PDSN/FA 140.

The PDSN/FA 140 comprises a PDSN for processing PPP setup so that the MS 110 is connected to the PDSN, and an FA for managing a current IP address of the MS 110 in cooperation with an HA 170. Mobility of the MS 110 using the packet data service is guaranteed by well-known Mobile IP (MIP), and the MIP supports the mobility by using two IP addresses for the MS 110. Of the two IP addresses, one is a home address that is fixed regardless of the current position of the MS 110, and the other is a Care-of-Address (CoA) that varies according to the current position of the MS 110. The home address and the CoA are handled by the HA 170 and the FA, respectively.

The PDSN/FA 140 serves as a gateway that establishes a PPP session to the MS 110 and then allows the MS 110 to exchange packet data with an undepicted Correspondent Node (CN). The CN refers to an application server that is connected to a packet data network such as an IP network 1, and provides packet service to the MS 110. An Access Router (AR/FA) 160 comprises an AR for routing an access route of the MS 110 connected to the WLAN, and an FA for delivering packet data of the CN, received from the HA 170 using a Tunneling Protocol, to the current position, i.e., CoA, of the MS 110, or delivering packet data of the MS 110 to the CN.

All packet data targeting the MS 110 is first delivered to the HA 170 in the IP network 1, which manages the fixed home address of the MS 110. The CN, which is an external host that exchanges packet data with the MS 110, is unaware of the CoA indicating the current position of the MS 110 and is aware of only the fixed home address of the MS 110. Therefore, the packet data targeting the MS 110 is first delivered to the FA of the PDSN/FA 140 or the FA of the AR/FA 160 via the HA 170 according to the network to which the MS 110 is currently connected, and then, transmitted to the MS 110 via the PDSN/FA 140 or the AR/FA 160.

In the foregoing network configuration in which the mobile communication network and the WLAN for packet service are interworking with each other, because the two networks operate separately, it is possible to enable interworking (i.e., handoff) between the two networks using MIP without the change in the existing network configuration and protocol configuration.

FIG. 2 is a diagram illustrating an environment of a conventional mobile terminal supporting a multiaccess function (hereinafter referred to as a "multiaccess mobile terminal").

Referring to FIG. 2, the mobile station (MS) 110, now referred to as the multiaccess mobile terminal (MT) 110, can access the IP network 1 via any one of a WCDMA interface 210, a CDMA 1x/DO interface (hereinafter referred to as a "mobile communication network interface") 220, a WLAN interface 230, and a BWA network interface 240. The MT 110 can access a Video-on-Demand (VoD) server 250 via the IP network 1 to receive VoD service. In addition, the MT 110 can access an IP broadcast server 260 via the IP network 1 to receive broadcast service. In FIG. 2, a solid line between the MT 110 and the VoD server 250 represents a packet call flow via the mobile communication network interface 220, and a dotted line between the MT 110 and the VoD server 250 represents a packet call flow via the WLAN interface 230.

FIG. 3 is a diagram illustrating protocol stacks of a conventional MT, BTS/BSC, PDSN, IP network, and VoD server according to an access scheme. A detailed description will now be made of a process in which data is transmitted from a VoD server to an MT using the protocol stacks of FIG. 3 when the MT accesses a mobile communication network.

In a VoD server 250, if an application layer 251 generates data to transmit to the MT 110 via a mobile communication network, an RTP layer 252 provides the data to an IP layer 254 via a UDP layer 253 to transmit a moving image in real time. Then the IP layer 254 transmits the data to a physical (PHY) layer 2 of the IP network 1 via Ethernets 255 and 256 according to destination. In the IP network 1, the physical layer 2 transmits the data to an IP layer 141 of the PDSN/FA 140, now referred to as the PDSN 140, via a MAC layer 3, an IP layer 4, and an IP layer 5. Then, the IP layer 141 of the PDSN 140 transmits the data to a PPP layer 142. The PPP layer 142 delivers the data to a GRE layer 143 to set up a tunnel, and transmits the data to an IP layer 144 through the set tunnel. The IP layer 144 of the PDSN 140 transmits the data to an IP layer 123 of the base station (BS) 120, now referred to as the BTS/BSC 120, via a MAC layer 145 and a physical layer 146 of the PDSN 140, and a physical layer 121 and a MAC layer 122 of the BTS/BSC 120. The IP layer 123 of the BTS/BSC 120 sets up a tunnel via a GRE layer 124 and transmits the data to an RLP layer 125 via the set tunnel. The RLP layer 125, because the wireless channel environment is a mobile communication network, transmits the data to a 1x Air layer 111 of the MT 110 via a 1x Air layer 126 as shown in FIG. 3. The 1x Air layer 111 of the MT 110 provides the received data to an IP layer 113 via an RLP layer 112. Thereafter, the IP layer 113 of the MT 110 transmits the data to an RTP layer 115 via a UDP layer 114.

FIG. 4 is a diagram illustrating protocol stacks of a conventional MT, AP/APC, IP network, and VoD server according to an access scheme. A detailed description will now be made of a process in which data is transmitted from the VoD server to the MT using the protocol stacks of FIG. 4 when the MT moves from a mobile communication network area to a WLAN area.

In the VoD server 250, if there is data to transmit to the MT 110 via a WLAN, the RTP layer 252 provides the data to the IP layer 254 via the UDP layer 253 to transmit a moving image in real time. Then the IP layer 254 of the VoD server 250 delivers the data to the physical layer 2 of the IP network 1 via Ethernets 255 and 256 according to destination. The physical layer 2 of the IP network 1 transmits the data to an 802.11 physical layer 151 of the AP/APC 150 via the MAC layer 3, the IP layer 4, the IP layer 5, a MAC layer 6 and a physical layer 7. The 802.11 physical layer 151 of the AP/APC 150 passes the data through an 802.11 MAC layer 152, and then transmits the data to an 802.11 physical layer 116 of the MT 110. An 802.11 physical layer 117 of the MT 110 provides the data to the IP layer 113. The IP layer 113 of the MT 110 transmits the data to the RTP layer 115 via the UDP layer 114.

Even though the MT 110 has changed Air interfaces after moving from the mobile communication network area to the WLAN area, the VoD server 250 is unaware of the change in the Air interface.

That is, as shown in FIGS. 3 and 4, the MT 110 has difficulty in determining from received data whether a wireless link will temporarily decrease in bandwidth because of an obstacle or jamming, or the wireless link itself has changed. In other words, the MT 110 has difficulty in determining the change in the wireless link based on the feedback information transmitted once to the VoD server 250.

In addition, when the MT 110 moves between two network interfaces whose wireless links greatly differ in bandwidth, a convergence time of an application layer, required for finding the optimal coding rate or bandwidth, is inefficient because there are predictable average/maximum/minimum bandwidths due to characteristics of the wireless links.

If for example, it is assumed that the MT 110 receiving VoD service using a mobile communication network has moved to a WLAN area, the MT 110 first transmits data via a bearer traffic path based on a mobile communication network air interface (CDMA Air Interface) as shown in FIG. 3, and after moving to the WLAN area, the MT 110 transmits the data via a bearer traffic path based on a WLAN air interface (802.11 Air Interface) as shown in FIG. 4. In this situation, however, an application program of the MT 110 or the VoD server 250 can not be aware of the change in the air interface. Because handoff is performed without the change in IP address for seamless service, the existing Upper Layer 3 protocol implemented using only the information provided by the IP layer can not be aware of the change in the air interface. Therefore, as shown in FIG. 4, although the broadband WLAN interface is used, only the narrowband packets are transmitted inefficiently.

FIG. 5 illustrates a conventional process of feeding back the video frame transmitted from the VoD server 250 by the MT 110. If there is no error in several video frames transmitted from the VoD server 250, the MT 110 requests the VoD server 250 to increase the bandwidth step by step, determining that the available bandwidth has increased. Then, as shown in FIG. 6, the VoD server 250 transmits a video frame to the MT 110 via the IP network 1 with a broader bandwidth at a higher coding rate. Compared with the solid line shown in FIG. 3, the solid line shown in FIG. 6 is thicker, denoting that the video frame is transmitted with a broader bandwidth. If the foregoing conventional process is repeatedly performed, the transmission bandwidth increases step by step, finally reaching an effective bandwidth.

The conventional processes of FIGS. 3 through 6 can be summarized with reference to a flow diagram illustrated in FIG. 7.

Referring to FIG. 7, the VoD server 250 transmits a video frame to the MT 110 via the PDSN 140 and the BS 120 in step 701, to provide VoD service. In this case, because the MT 110 is connected to a mobile communication network, the VoD server 250 transmits the video frame to the MT 110 via the IP network 1, the PDSN 140, and the BS 120. Then, in step 702, the MT 110 estimates its performance through a program of its application layer and transmits the resultant feedback information to the VoD server 250. In this case, the MT 110 calculates the optimal bandwidth by estimating end-to-end performance, and then transmits the resultant feedback information to the VoD server 250.

If the MT 110 moves from the mobile communication network to the WLAN, the MT 110 detects handoff in step 703.

If the MT 110 connected to the mobile communication network desires to perform handoff to the WLAN area, the MT 110 performs the following operation in step 704. The MT 110 first sends a PROBE request to all APs located in a corresponding area, to distinguish each AP and determine its signal strength. Upon receiving the PROBE request, the APs send a PROBE response including beacon information for identification of the corresponding APs. The MT 110 selects the AP having the highest signal strength for the beacon information among the APs from which the PROBE response was received, and sends an Association request for a desired access to a WLAN, to the selected AP. Upon receiving the Association request, the AP 150 transmits to the MT 110 an Association response including its own bit rate and ID, and information required for WLAN communication.

Upon receiving the Association response, the MT 110 performs a handoff procedure with the PDSN 140 in step 705. The MT 110 completes the handoff and changes air interfaces in step 706. In this case, service application layers of the MT 110 and the VoD server 250 are unaware of the change in the air interfaces.

Thereafter, in steps 707 through 710, the VoD server 250 transmits video frames to the MT 110. Further, in steps 711 through 714, the MT 110 estimates its performance through the program of its application layer, and transmits the resultant feedback information to the VoD server 250. The hollow arrows shown in steps 707 through 710 represent the maximum available bandwidth. If the MT 11.0 performs handoff from the mobile communication network to the WLAN, the maximum transmission bandwidth increases tens to hundreds of times. However, the service application layer of the MT 110 or the VoD server 250, because it is not aware of the increase in the bandwidth, increases the transmission bandwidth step by step, causing a decrease in the efficiency of the broadband air interface.

Accordingly, a need exists for a system and method for allowing a multiaccess mobile terminal to receive packet data at an optimal coding rate or with an optimal bandwidth when the multiaccess mobile terminal moves and changes interfaces.

SUMMARY OF THE INVENTION

It is, therefore, an object of embodiments of the present invention to substantially solve the above and other problems, and provide an apparatus and method for allowing a multiaccess mobile terminal to receive packet data at an optimal coding rate or with an optimal bandwidth when the multiaccess mobile terminal moves between different wireless links, thereby changing interfaces.

It is another object of embodiments of the present invention to provide an apparatus and method for transmitting data with a narrow bandwidth in a wireless link having a broad bandwidth to prevent the inefficient situation in which quality-of-service (QoS) can not be fully used.

It is another object of embodiments of the present invention to provide an apparatus and method for transmitting data with a broad bandwidth in a wireless link having a broad bandwidth to minimize the situation in which service is dropped.

According to one aspect of embodiments of the present invention, an apparatus is provided for changing network interfaces in a multiaccess mobile terminal in a wireless communication system including a server for providing high-capacity data transmission service to a mobile terminal, and the terminal for receiving data from the server and supporting various network interfaces. The apparatus comprises an interface module for, upon detecting handoff based on current air information received, reporting a change in interface to a new air interface to an upper layer, and managing the mobile terminal such that traffic is transmitted to the new air interface, and a service module for, upon receiving information on the new air interface from the interface module, determining a bandwidth of the new air interface, generating a message based on the determined bandwidth, and transmitting the generated message.

According to another aspect of embodiments of the present invention, a system is provided for changing network interfaces in a mobile terminal in a wireless communication system including a server for providing high-capacity data transmission service to the mobile terminal, and the terminal for receiving data from the server and supporting various network interfaces. The system comprises the mobile terminal for, upon detecting handoff based on current air information received, reporting a change in interface to a new air interface to an upper layer, determining a bandwidth of the new air interface using information on the new air interface, generating a message based on the determined bandwidth, and transmitting the generated message, and the server for receiving the message generated based on the determined bandwidth from the mobile terminal, and transmitting data to the mobile terminal with a bandwidth suitable for the new air interface.

According to another aspect of embodiments of the present invention, a method is provided for changing network interfaces in a multiaccess mobile terminal in a wireless communication system including a server for providing high-capacity data transmission service to a mobile terminal, and the terminal for receiving data from the server and supporting various network interfaces. The method comprises the steps of, upon detecting handoff based on current air information received, reporting a change in interface to a new air interface to an upper layer, and upon receiving information on the new air interface, determining a bandwidth of the new air interface, generating a message based on the determined bandwidth, and transmitting the generated message to the server.

According to yet another aspect of embodiments of the present invention, a method is provided for changing network interfaces in a multiaccess mobile terminal in a wireless communication system including a server for providing high-capacity data transmission service to a mobile terminal, and the terminal for receiving data from the server and supporting various network interfaces. The method comprises the steps of receiving data from the server, determining a bandwidth of a current interface, and transmitting feedback information given based on the determined bandwidth to the server, and if there is a change in interface as handoff to a network using a new interface is completed, determining a bandwidth of the new interface, and transmitting a message generated based on the determined bandwidth to the server.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

An apparatus for changing network interfaces in a multi-access mobile 30 terminal according to an embodiment of the present invention can access a WCDMA network, a CDMA 1x/DO network, a WLAN, and a BWA network via various network interfaces, i.e., a WCDMA interface, a CDMA 1x/DO interface, a WLAN interface, and a BWA network interface, and can change the network interfaces.

An application program of the mobile terminal reports the change in the interface to a VoD server using Real-time Transport Control Protocol (RTCP)/Real Time Streaming Protocol (RTSP). Upon receiving the report on the change in the interface from the mobile terminal, the VoD server can transmit packets to the mobile terminal at the optimal coding rate with the optimal bandwidth.

Figure 1:
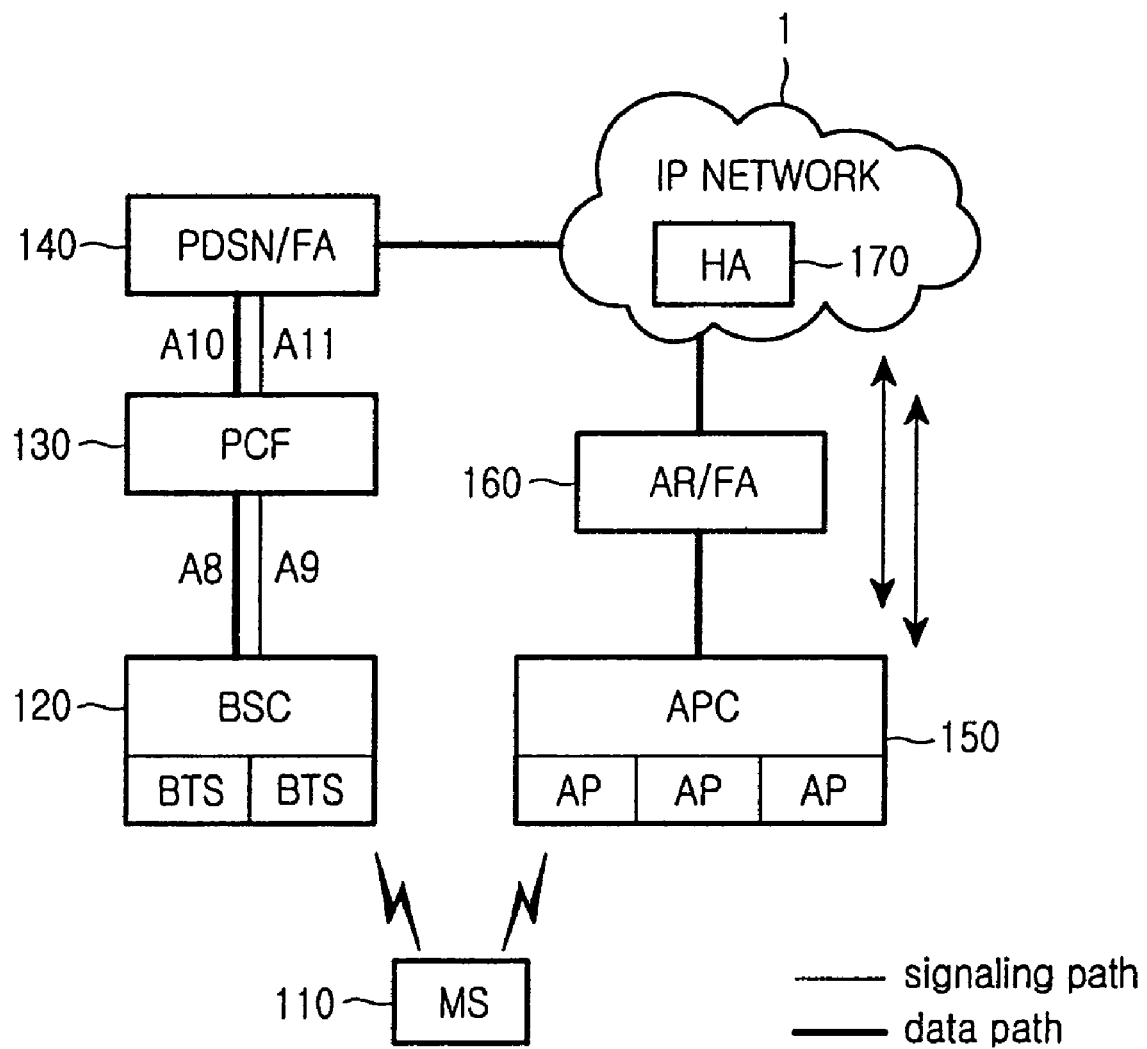
FIG. 1 is a block diagram illustrating a configuration of a general mobile communication system providing handoff service.
Figure 2:
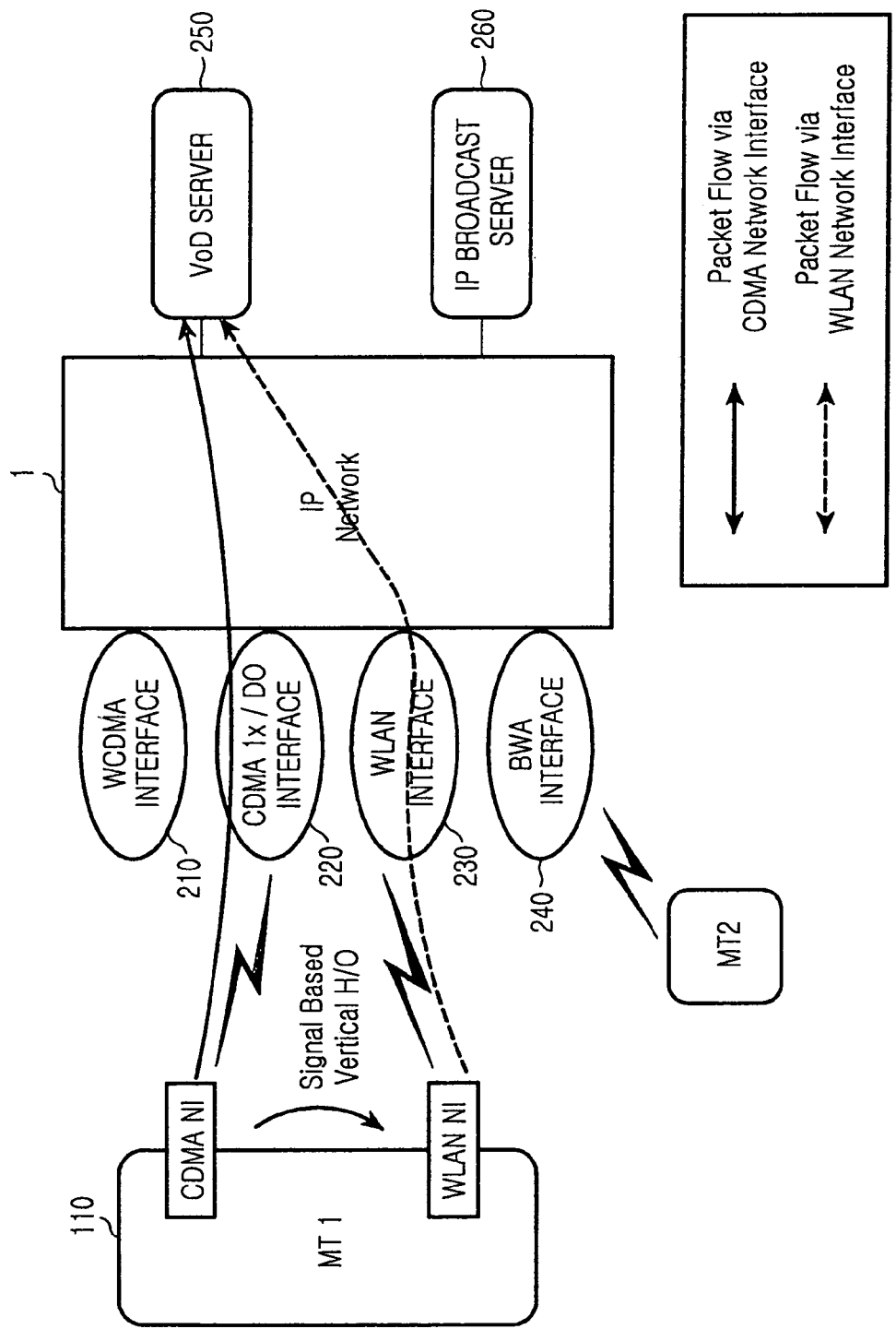
FIG. 2 is a diagram illustrating an interface of a conventional multiaccess mobile terminal, capable of accessing WCDMA, CDMA 1x/DO, WLAN and BWA networks.
Figure 3:
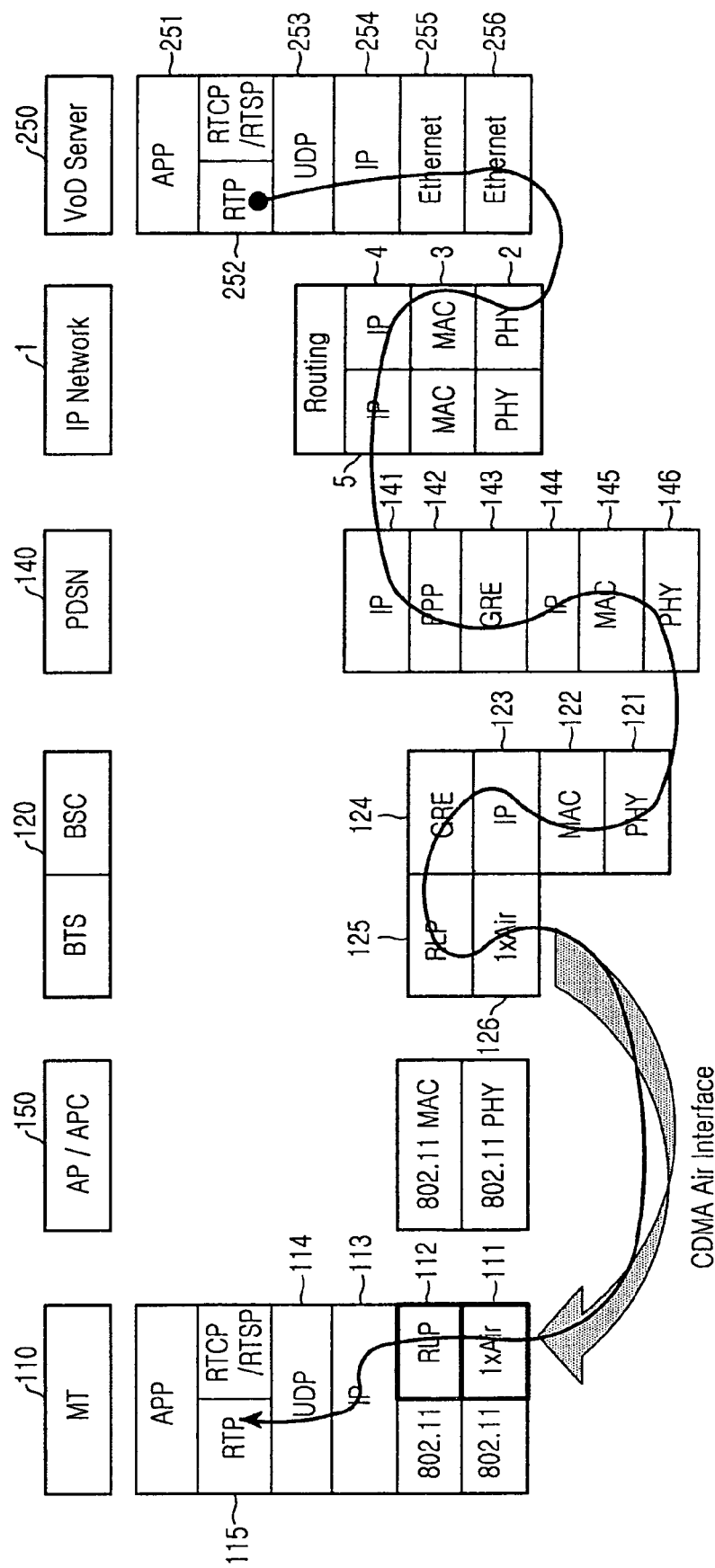
FIG. 3 is a diagram illustrating protocol stacks of a conventional MT, BTS/BSC, PDSN, IP network, and VoD server according to an access scheme.
Figure 4:
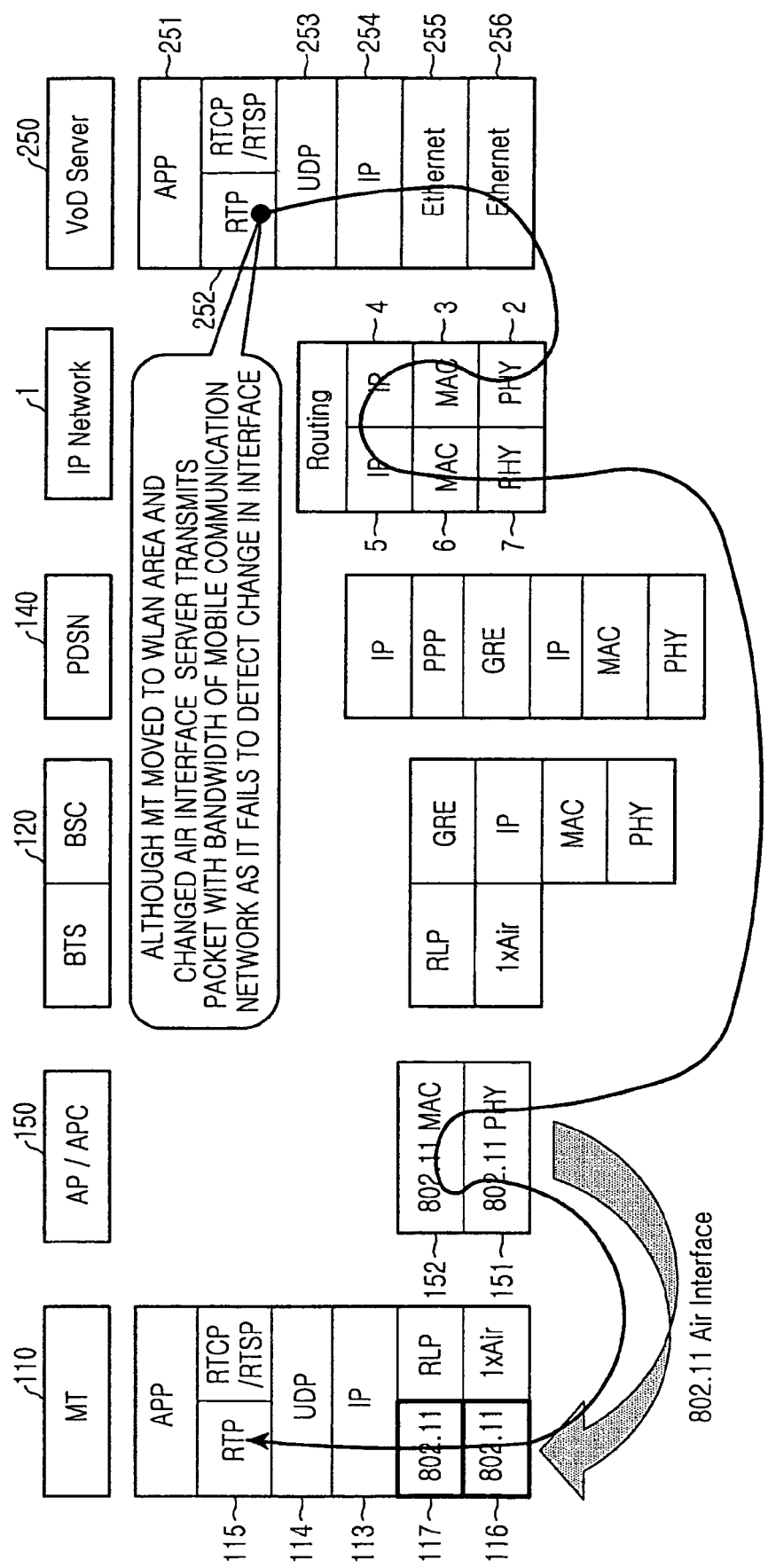
FIG. 4 is a diagram illustrating protocol stacks of a conventional MT, AP/APC, IP network, and VoD server according to an access scheme.
Figure 5:
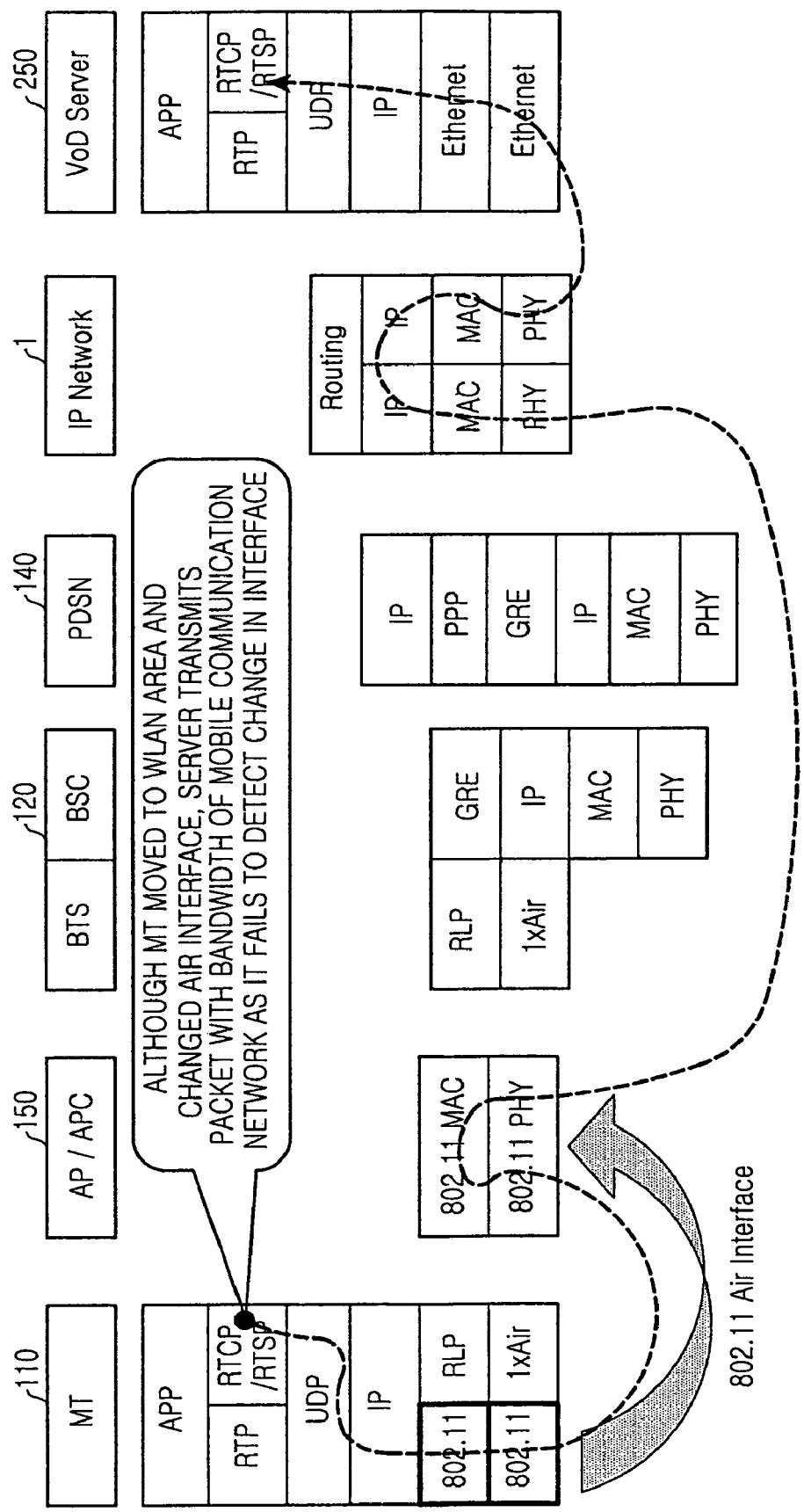
FIG. 5 is a diagram illustrating protocol stacks for a conventional process of feeding a video frame transmitted from a VoD server back to the VoD server by the MT.
Figure 6:
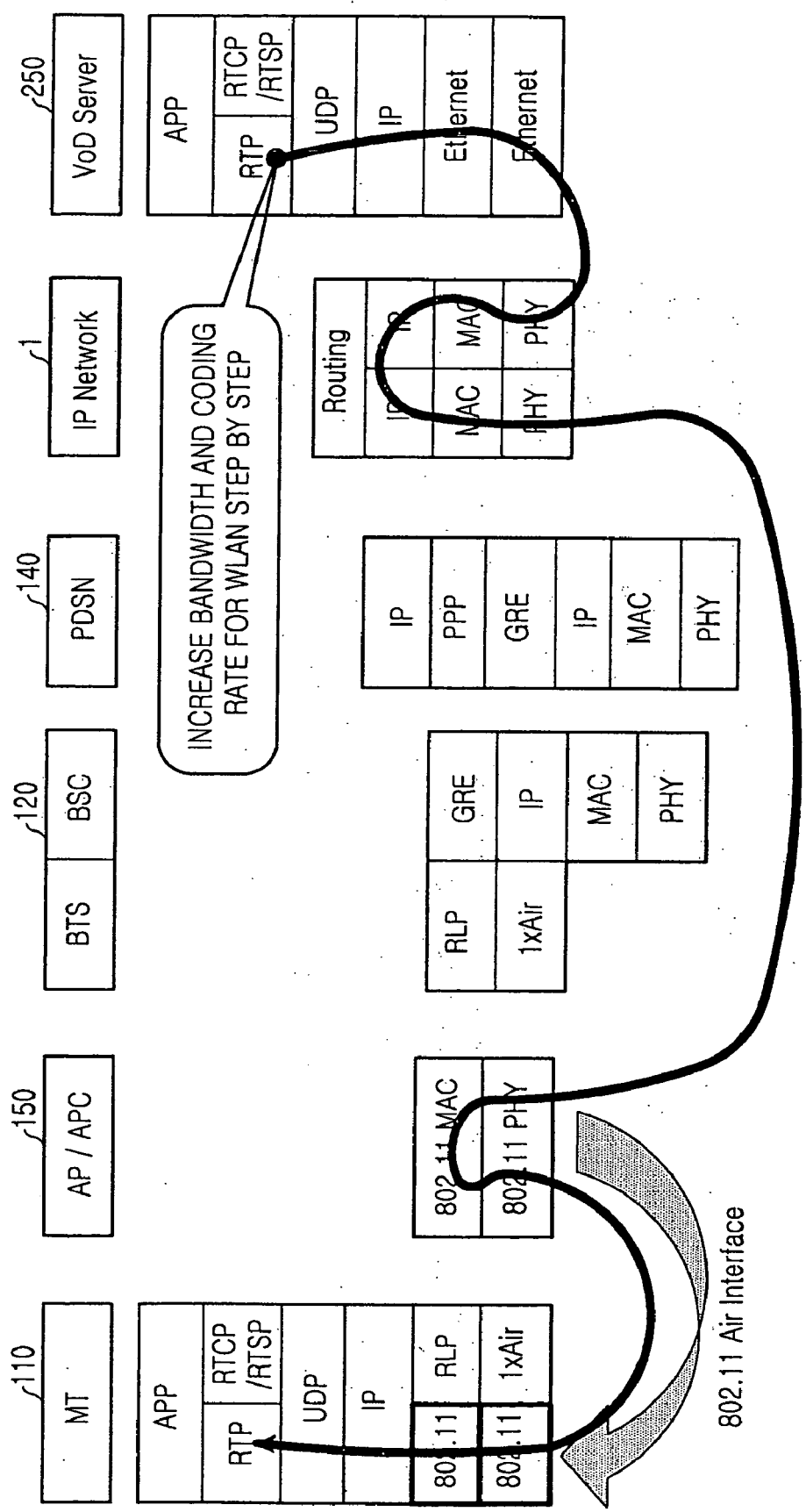
FIG. 6 is a diagram illustrating protocol stacks for a conventional process of transmitting by a VoD server a video frame to an MT through an IP network with a broader bandwidth at a higher coding rate.
Figure 7:
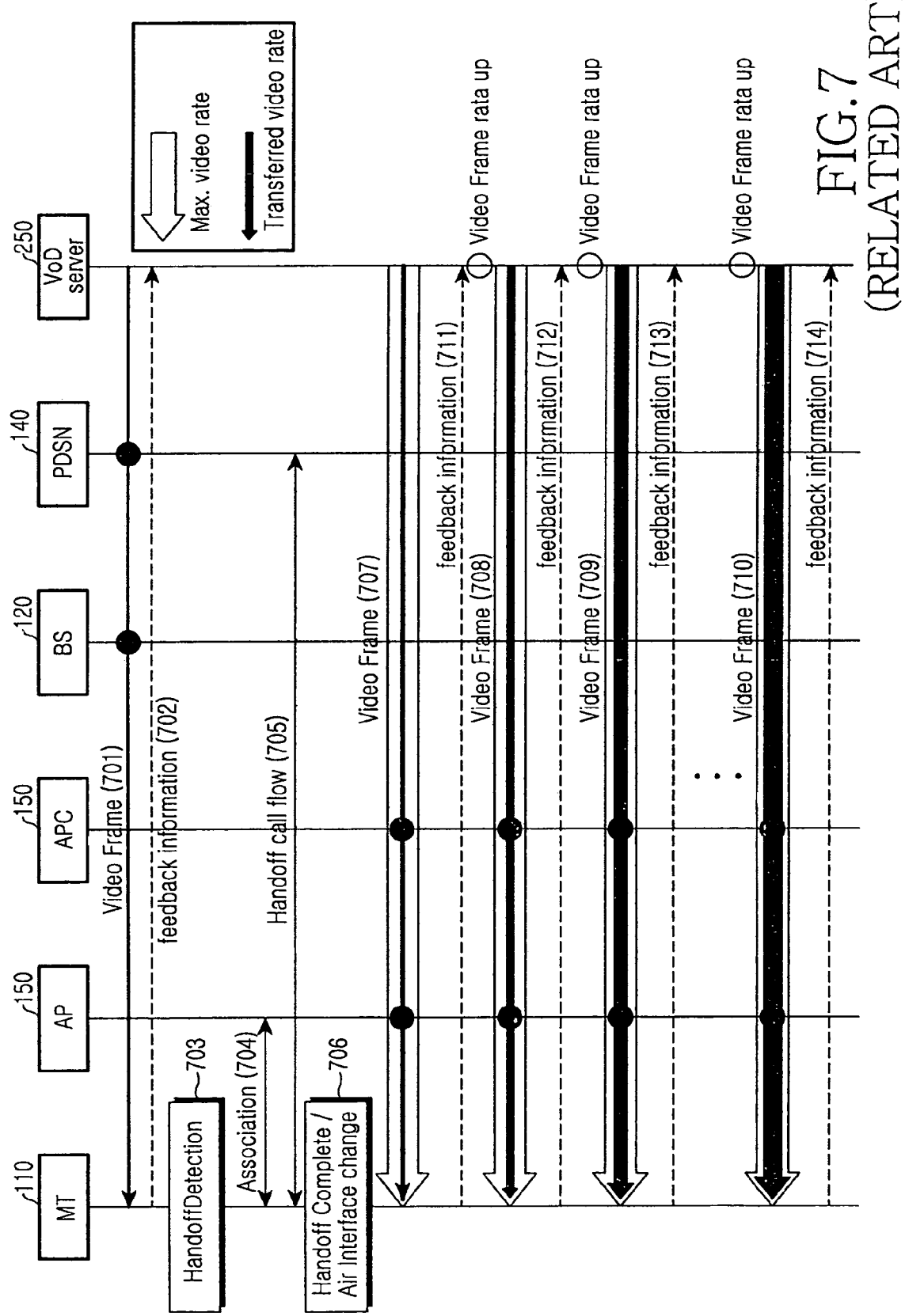
FIG. 7 is a flow diagram illustrating a conventional process of changing network interfaces in an MT according to the prior art.
Figure 8:
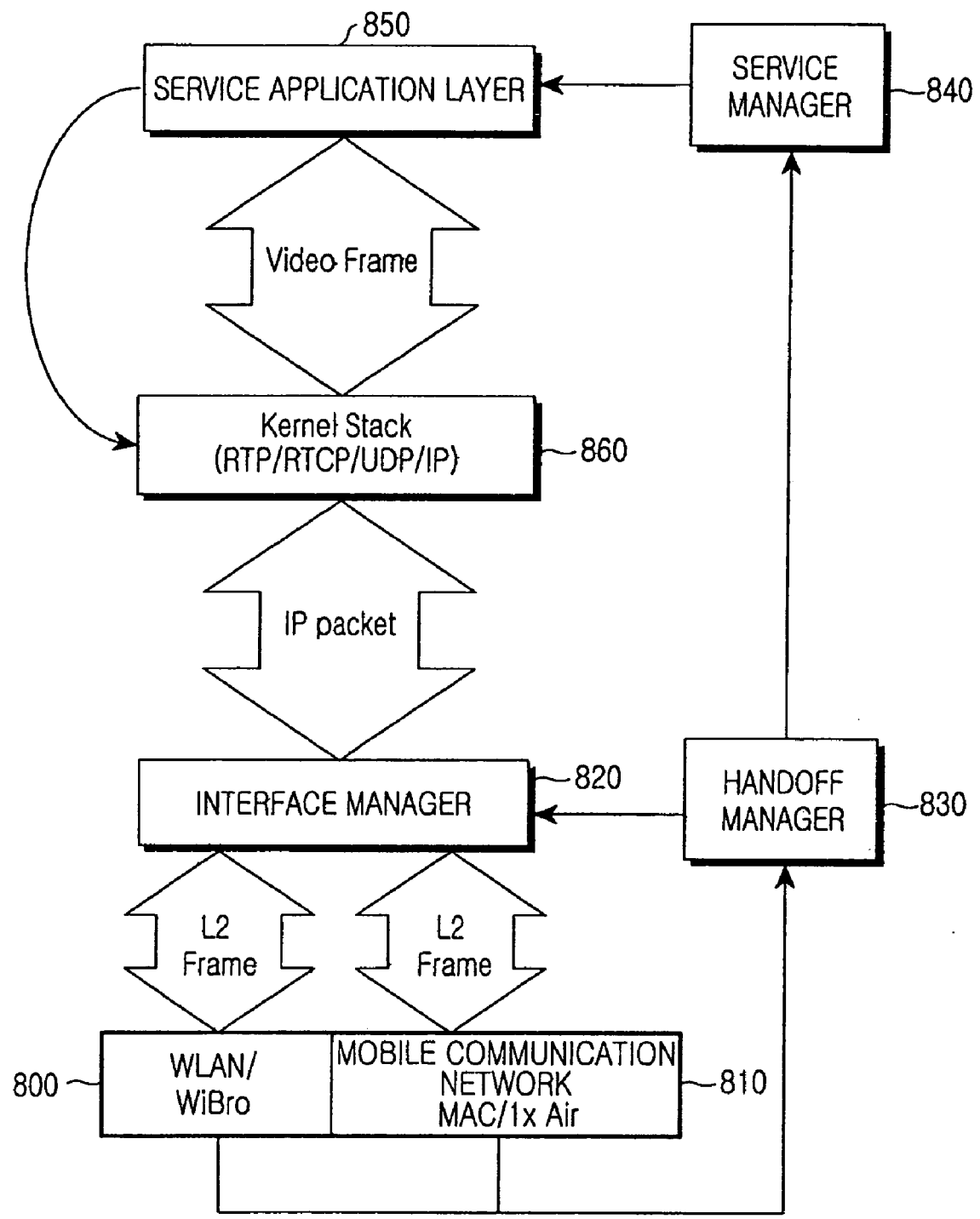
FIG. 8 is a block diagram illustrating an exemplary apparatus for changing network interfaces in a mobile terminal according to an embodiment of the present invention.

With reference to FIG. 8, a description will now be made of an exemplary apparatus for changing network interfaces in a mobile terminal according to an embodiment of the present invention. The elements shown in FIGS. 8 through 11 which are substantially the same as elements shown in FIGS. 1 and 2 are denoted by the same reference numerals.

For illustrating the following description, it can be assumed for example that the MT 110, when it is connected to a mobile communication network, receives packets from the VoD server 250 with a bandwidth and a coding rate, both of which are optimized for the mobile communication network. Upon receiving packets via a MAC/1x Air layer 810 of the mobile communication network, the MT 110 provides its air information to a handoff manager 830. In addition, upon receiving packets via a WLAN or a BWA network, the MT 110 provides its air information to the handoff manager 830.

If the MT 110 has moved from a mobile communication network area to a WLAN area, the handoff manager 830 determines with which air signal it will transmit traffic. That is, if the strength of a signal from the BS 120 is lower than a threshold, the handoff manager 830 can detect that the MT 110 has moved from the mobile communication network area to the WLAN area. The handoff manager 830 then reports the change in the interface of the MT 110 to an interface manager 820. Then the interface manager 820 changes a mobile communication network interface for a WLAN interface. Thereafter, the handoff manager 830 informs a service manger 840 that the interface has changed from the mobile communication network interface to the WLAN interface. Then the service manager 840 determines an optimal bandwidth value suitable for the new air interface, and provides the resultant information to a service application layer 850. The service application layer 850 generates a message including feedback information using the optimal bandwidth value informed by the service manager 840, and transmits the generated message to the VoD server 250 via a kernel stack 860, i.e., an RTCP/RTSP layer.

Figure 9:
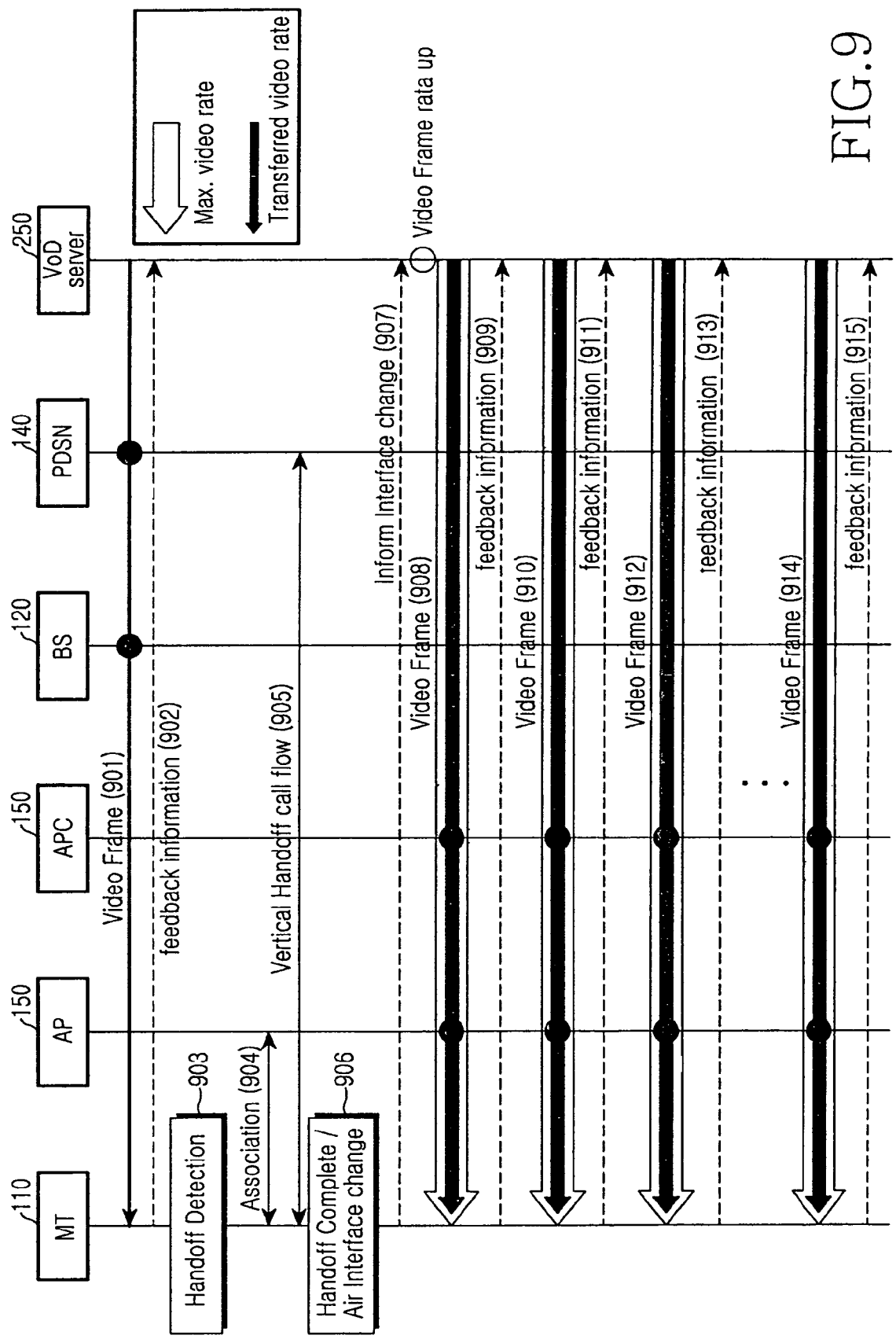
FIG. 9 is a flow diagram illustrating an exemplary process of changing network interfaces from a mobile communication network interface to a WLAN interface in a mobile terminal according to an embodiment of the present invention.

With reference to FIG. 9, a description will now be made of an exemplary method for changing network interfaces in a mobile terminal according to an embodiment of the present invention.

Referring to FIG. 9, the VoD server 250. transmits a video frame to an MT 110 via the PDSN 140 and the BS 120 in step 901, to provide VoD service. In this case, because the MT 110 is connected to a mobile communication network, the VoD server 250 transmits the video frame to the MT 110 via the IP network 1, the PDSN 140, and the BS 120. Then, in step 902, the MT 110 estimates its performance through a program of its application layer and transmits the resultant feedback information to the VoD server 250. That is, the MT 110 calculates the optimal bandwidth by estimating end-to-end performance, and then transmits the resultant feedback information to the VoD server 250.

If the MT 110 moves from the mobile communication network to the WLAN, the MT 110 detects handoff in step 903. Herein, the MT 110 detects the handoff from the mobile communication network to the WLAN if the strength of a signal from the BS 120 is lower than a threshold.

If the MT 110 performs handoff from the mobile communication network area to the WLAN area, the MT 110 performs the following operations in step 904. The MT 110 first sends a PROBE request to all APs located in a corresponding area, to distinguish each AP and determine its signal strength. Upon receiving the PROBE request, the APs send a PROBE response including beacon information for identification of the corresponding APs. The MT 110 selects the AP having the highest signal strength for the beacon information among the APs from which the PROBE response was received, and sends an Association request for a desired access to a WLAN, to the selected AP. Upon receiving the Association request, the AP 150 transmits to the MT 110 an Association response including its own bit rate and ID, and information required for WLAN communication.

Upon receiving the Association response, the MT 110 performs a handoff procedure with the PDSN 140 in step 905. The MT 110 completes the handoff and changes air interfaces in step 906. The process of changing the air interfaces is performed as follows.

The handoff manager 830 of the MT 110 first reports the change in the interface from a mobile communication network interface to a WLAN interface, to the service manager 840. Then the service manager 840 determines an optimal bandwidth value suitable for the new air interface, and provides the resultant information to the service application layer 850. The service application layer 850 generates a message including feedback information using the optimal bandwidth value informed by the service manager 840, and transmits the generated message to the VoD server 250 via the kernel stack 860, i.e., an RTCP/RTSP layer, in step 907.

If the MT 110 changes the interface from the mobile communication network interface to the WLAN interface, it reports the change in the interface to a service application program, i.e., the service application layer 850. Therefore, the service application layer 850 is aware that the available transmission bandwidth has increased tens to hundreds of times, and reports the increase in the available transmission bandwidth to the VoD server 250 using a feedback information message.

The change of the MT 110 in the interface from the mobile communication network interface to the VVLAN interface causes a large change in bandwidth. The MT 110 generally selects the optimal interface based on its signal strength when it moves between air interfaces. In this situation, because the subject for determining selection of the optimal interface is the MT, the MT 110 can first recognize the change in the bandwidth due to the selection and can adapt itself to the network situation. The MT 110 measures the strength of a radio signal through each air link and converts the measurement result into a numerical value. The service application layer 850 that preferably provides service regardless of the change in the wireless link, determines the change in the network interface based on the numerical value.

After step 907, the VoD server 250 transmits data to the MT 110 via the AP/APC 150 in step 908. In this case, the VoD server 250 knowing the increase in the available transmission bandwidth increases the transmission bandwidth to an average bandwidth of the wireless access technology at once, instead of increasing the transmission bandwidth step by step. Actually, for an MT using a wireless link, the interval in which its performance is mostly affected when the MT performs communication over several hops, can be regarded as the wireless link. In FIG. 9, steps 907, 909, 911, 913, and 915 correspond to a process of transmitting feedback information from the MT 110 to the VoD server 250, and steps 908, 910, 912, and 914 correspond to a process of transmitting data from the VoD server 250 to the MT 110. Herein, the transmission bandwidths for the available bandwidth are denoted by black arrows in the hollow arrows. In embodiments of the present invention, the MT 110 directly transmits information on the bandwidth suitable for characteristics of the air signal to the VoD server 250, so that the bandwidth arrives at the optimal value faster than previously experienced.

Figure 10:
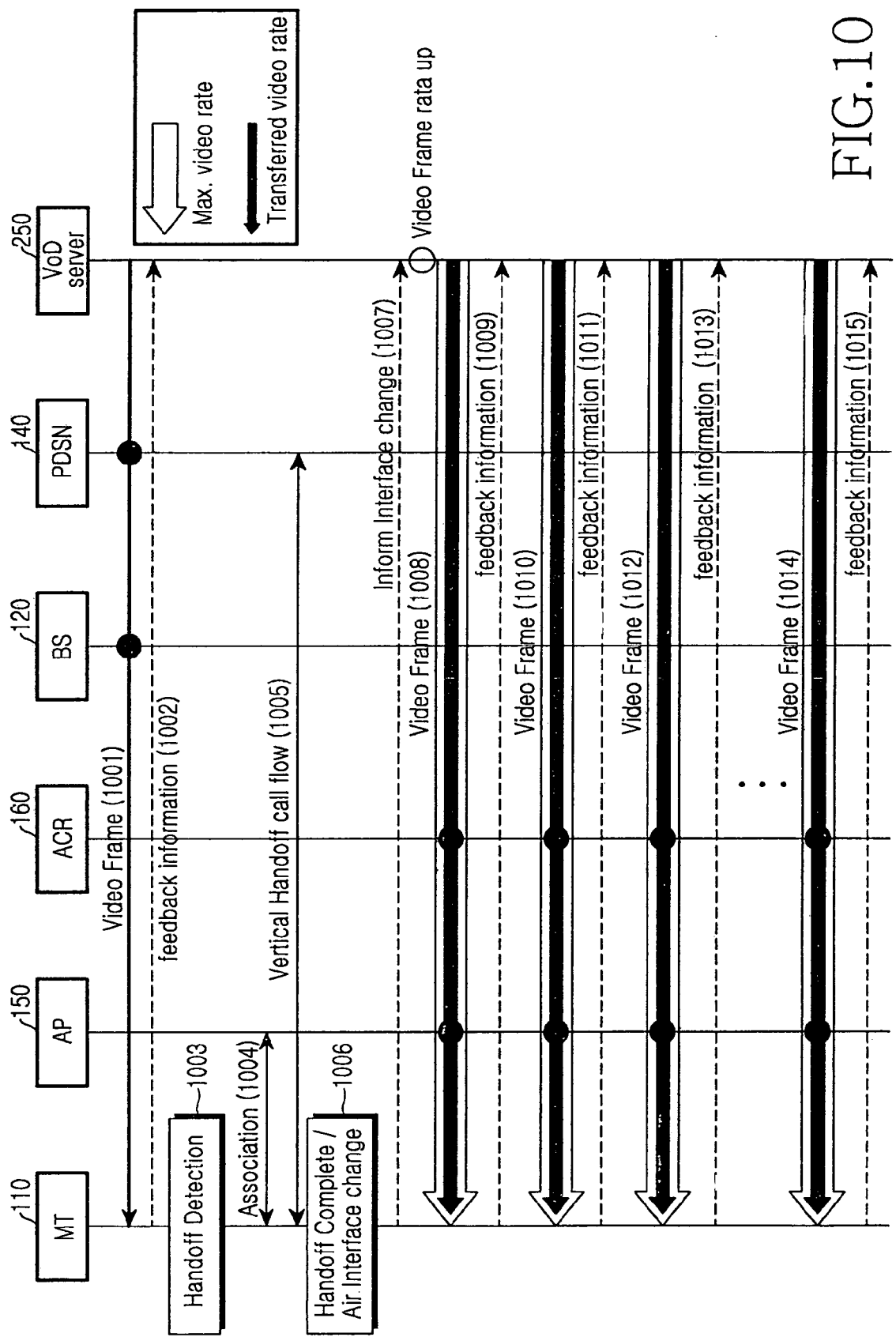
FIG. 10 is a flow diagram illustrating an exemplary process of changing network interfaces from a mobile communication network interface to a BWA interface in a mobile terminal according to another embodiment of the present invention.

With reference to FIG. 10, a description will now be made of an exemplary network interface apparatus and method in a multiaccess mobile terminal, applied to a BWA network, according to an embodiment of the present invention.

Referring to FIG. 10, the VoD server 250 transmits a video frame to the MT 110 via the PDSN 140 and the BS 120 in step 1001, to provide VoD service. In this case, because the MT 110 is connected to a mobile communication network, the VoD server 250 transmits the video frame to the MT 110 via the IP network 1, the PDSN 140 and the BS 120. Then, in step 1002, the MT 110 estimates its performance through a program of its application layer and transmits the resultant feedback information to the VoD server 250. That is, the MT 110 calculates the optimal bandwidth by estimating end-to-end performance, and then transmits the resultant feedback information to the VoD server 250.

If the MT 110 desires to move from a mobile communication network to a WLAN, the MT 110 detects handoff in step 1003. Herein, the MT 110 detects the handoff from the mobile communication network to the WLAN, if the strength of a signal from the BS 120 is lower than a threshold.

If the MT 110 connected to the mobile communication network desires to perform handoff to a BWA network, the MT 110 performs the following operations in step 1004. The MT 110 periodically receives DCD, DL-MAP, UCD, and UL-MAP messages from all APs located in a corresponding area to scan a corresponding AP, and then performs downlink channel synchronization and uplink parameter acquisition. Thereafter, the MT 110 sends a Ranging Request message including its MAC address to the selected AP 150. In response, the AP 150 sets Basic/Primary/Management CIDs, and sends a Ranging Response message including the set information to the MT 110.

Upon receiving the Association response, the MT 110 performs a handoff procedure with the PDSN 140 in step 1005. The MT 110 completes the handoff from the mobile communication network to the BWA network and changes air interfaces in step 1006. The process of changing the air interfaces is performed as follows.

The handoff manager 830 first reports the change in the interface from a mobile communication network interface to a BWA interface, to the service manager 840. Then the service manager 840 determines an optimal bandwidth value suitable for the new air interface, and provides the resultant information to the service application layer 850. The service application layer 850 generates a message including feedback information using the optimal bandwidth value informed by the service manager 840, and transmits the generated message to the VoD server 250 via the kernel stack 860, i.e., an RTCP/RTSP layer, in step 1007.

If the MT 110 changes the interface from the mobile communication network interface to the BWA interface, it reports the change in the interface to a service application program, i.e., the service application layer 850. Therefore, the service application layer 850 is aware that the available transmission bandwidth has increased tens to hundreds of times, and reports the increase in the available transmission bandwidth to the VoD server 250 using a feedback information message.

The change of the MT 110 in the interface from the mobile communication network interface to the BWA interface causes a large change in bandwidth. The MT 110 generally selects the optimal interface based on its signal strength when it moves between air interfaces. In this situation, because the subject for determining selection of the optimal interface is the MT, the MT 110 can first recognize the change in the bandwidth due to the selection and adapt itself to the network situation. The MT 110 measures the strength of a radio signal through each air link and converts the measurement result into a numerical value. The service application layer 850 that preferably provides service regardless of the change in the wireless link, determines the change in the network interface based on the numerical value.

After step 1007, the VoD server 250 transmits data to the MT 110 via the Access Router (AR/FA) 160, now referred to as the Access Control Router (ACR) 160, serving as a router in the BWA network, and the AP 150 in step 1008. In this case, the VoD server 250 knowing the increase in the available transmission bandwidth, increases the transmission bandwidth to an average bandwidth of the wireless access technology at once, instead of increasing the transmission bandwidth step by step. Actually, for an MT using a wireless link, the interval in which its performance is mostly affected when the MT performs communication over several hops, can be regarded as the wireless link. In FIG. 10, steps 1007, 1009, 1011, 1013, and 1015 correspond to a process of transmitting feedback information from the MT 110 to the VoD server 250, and steps 1008, 1010, 1012, and 1014 correspond to a process of transmitting data from the VoD server 250 to the MT 110. Herein, the transmission bandwidths for the available bandwidth are denoted by black arrows in the hollow arrows. In embodiments of the present invention, the MT 110 directly transmits information on the bandwidth suitable for characteristics of the air signal to the VoD server 250, so that the bandwidth arrives at the optimal value faster than previously experienced.

Because embodiments of the present invention are characterized by using Layer 1 (L1)/Layer 2 (L2) without the change, the BWA network and the WLAN are almost similar to each other in operation.

Figure 11:
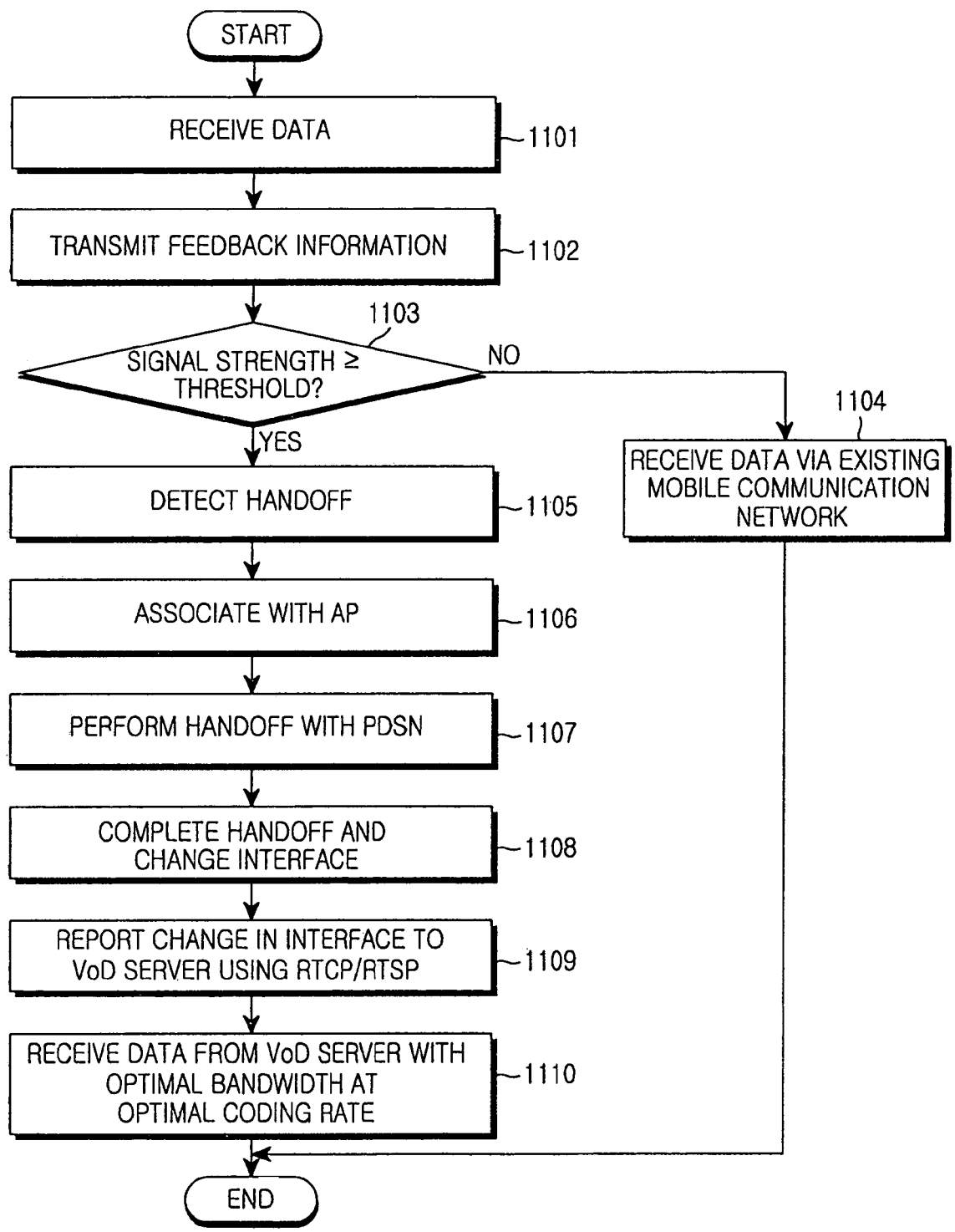
FIG. 11 is a flowchart illustrating an exemplary flow control between an MT and a VoD server when the MT changes network interfaces, according to an embodiment of the present invention.

FIG. 11 is a flowchart illustrating an exemplary flow control between an MT and a VoD server when the MT changes network interfaces, according to an embodiment of the present invention. With reference to FIG. 11, a description will now be made of a method for changing network interfaces in an MT according to an embodiment of the present invention.

Referring to FIG. 11, in step 1101, the MT 110 receives data, i.e., a video frame, from the VoD server 250 via the PDSN 140 and the BS 120 to receive VoD service. In this case, because the MT 110 is connected to a mobile communication network, the VoD server 250 transmits the video frame to the MT 110 via the IP network 1, the PDSN 140 and the BS 120. Then, in step 1102, the MT 110 estimates its performance through a program of its application layer and transmits the resultant feedback information to the VoD server 250. That is, the MT 110 calculates the optimal bandwidth by estimating end-to-end performance, and then transmits the resultant feedback information to the VoD server 250. The MT 110 determines in step 1103 whether the strength of a signal from the BS 120 is greater than or equal to a threshold. If the strength of the signal from the BS 120 is not greater than or equal to the threshold, the MT 110 receives data via the existing mobile communication network in step 1104. However, if the strength of the signal from the BS 120 is greater than or equal to the threshold, the MT 110 detects handoff in step 1105.

If the MT 110 connected to the mobile communication network desires to perform handoff to a WLAN area, it performs the following operations in step 1106.

The MT 110 first sends a PROBE request to all APs located in a corresponding area, to distinguish each AP and determine its signal strength. Upon receiving the PROBE request, the APs send a PROBE response including beacon information for identification of the corresponding APs. The MT 110 selects the AP having the highest signal strength for the beacon information among the APs from which the PROBE response was received, and sends an Association request for a desired access to a WLAN, to the selected AP. Upon receiving the Association request, the AP 150 transmits to the MT 110 an Association response including its own bit rate and ID, and information required for WLAN communication.

Upon receiving the Association response, the MT 110 performs a handoff procedure with the PDSN 140 in step 1107. The MT 110 completes the handoff and changes air interfaces in step 1108.

Figure 12:
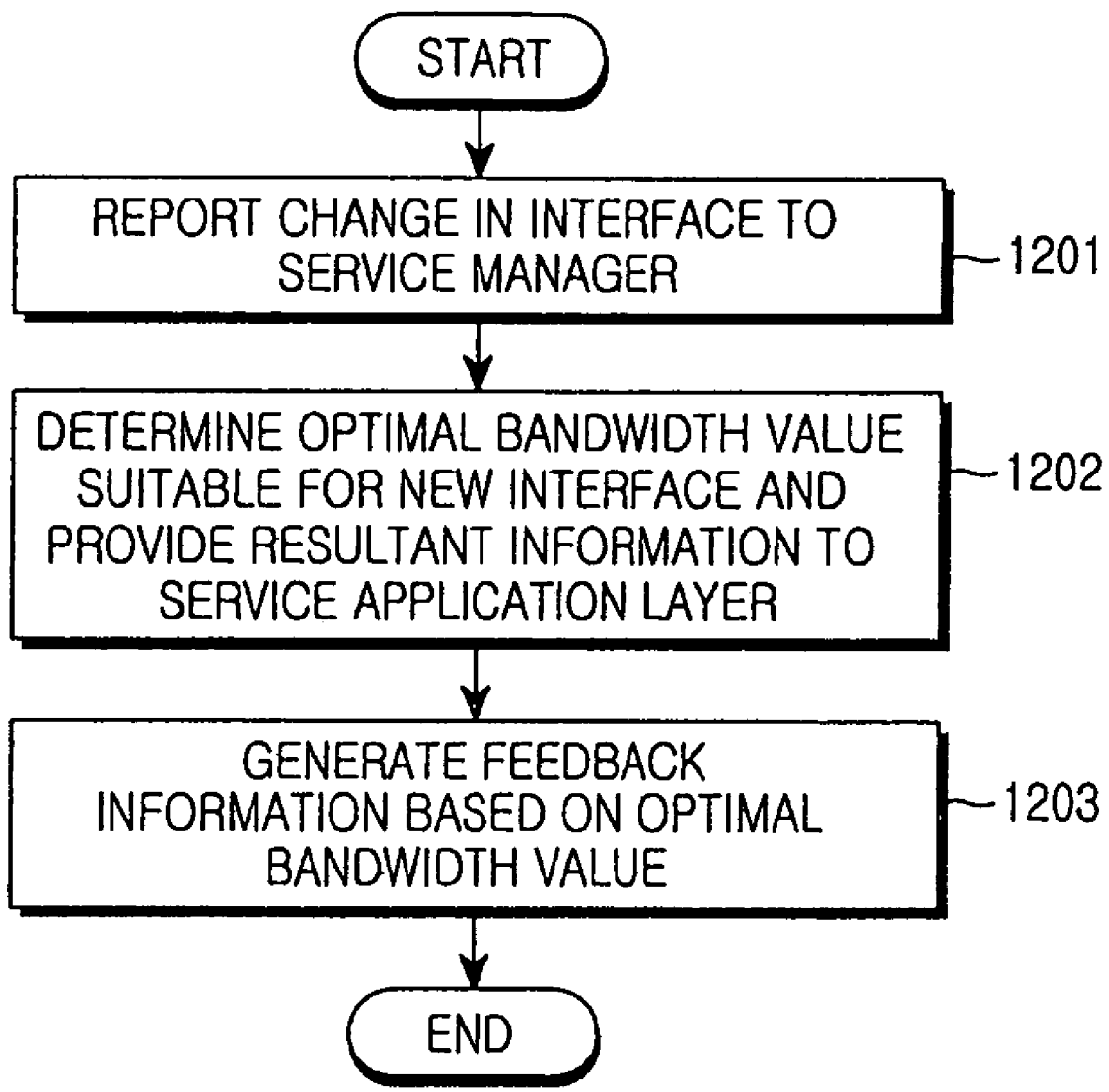
FIG. 12 is a flowchart illustrating an exemplary procedure for changing network interfaces in an MT according to an embodiment of the present invention.

FIG. 12 is a flowchart illustrating an exemplary procedure for changing interfaces in an MT according to an embodiment of the present invention. With reference to FIG. 12, a description will now be made of a method for changing interfaces in an MT according to an embodiment of the present invention.

Referring to FIG. 12, in step 1201, the handoff manager 830 of the MT 110 first reports the change in the interface from a mobile communication network interface to a WLAN interface, to the service manager 840. Then the service manager 840 determines an optimal bandwidth value suitable for the new air interface, and provides the resultant information to the service application layer 850 in step 1202. The service application layer 850 generates a message including feedback information using the optimal bandwidth value informed by the service manager 840 in step 1203.

Returning to FIG. 11, if the MT 110 changes the air interface from the mobile communication network interface to the WLAN interface in step 1108 of FIG. 11 and in the procedure of FIG. 12, the service application layer 850 is aware of the change in the interface and reports the change in the interface to the VoD server 250 using the kernel stack 860, i.e., an RTCP/RTSP layer in step 1109. Therefore, the service application layer 850 is aware that an available transmission bandwidth has increased tens to hundreds of times, and reports the increase in the available transmission bandwidth to the VoD server 250 using a feedback information message.

The change of the MT 110 in the interface from the mobile communication network interface to the WLAN interface causes a large change in bandwidth. The MT 110 generally selects the optimal interface based on its signal strength when it moves between air interfaces. In this situation, because the subject for determining selection of the optimal interface is the MT, the MT 110 can first recognize the change in the bandwidth due to the selection and adapt itself to the network situation. The MT 110 measures the strength of a radio signal through each air link and converts the measurement result into a numerical value. The service application layer 850 that preferably provides service regardless of the change in the wireless link, determines the change in the network interface based on the numerical value.

After step 1109, the MT 110 receives data from the VoD server 250 via the AP/APC 150 in step 1110. In this case, the VoD server 250 knowing the increase in the available transmission bandwidth, increases the transmission bandwidth to an average bandwidth of the wireless access technology at once, instead of increasing the transmission bandwidth step by step. Actually, for an MT using a wireless link, the interval in which its performance is mostly affected when the MT performs communication over several hops, can be regarded as the wireless link.

As described above, embodiments of the present invention provide an apparatus and method for allowing a multiaccess mobile terminal to receive packet data at an optimal coding rate or with an optimal bandwidth when the multiaccess mobile terminal moves between different wireless links.

In addition, embodiments of the present invention provide an apparatus and method for transmitting data with a narrow bandwidth in a wireless link having a broad bandwidth to prevent the inefficient situation in which quality-of-service (QoS) can not be fully used.

Further, embodiments of the present invention provide an apparatus and method for transmitting data with a broad bandwidth in a wireless link having a broad bandwidth to minimize the situation in which service is dropped.

Moreover, embodiments of the present invention provide an apparatus and method for allowing a mobile terminal traveling between network interfaces having different bandwidths to reduce an optimal bit rate and/or a time required in finding an efficient bandwidth, thereby contributing to guaranteeing the continuity of service while minimizing a load on the network due to the reduction.

While the present invention has been shown and described with reference to a certain exemplary embodiments thereof, it will be understood by those skilled in the art that various changes in form and details may be made therein without departing from the spirit and scope of the invention as defined by the appended claims.

What is claimed is:

1. An apparatus for changing network interfaces in a mobile terminal in a wireless communication system including a server for providing high-capacity data transmission service to the mobile terminal, and the mobile terminal for receiving data from the server and supporting various network interfaces, the apparatus comprising:

a handoff manager for, upon detecting handoff based on current network information received, transmitting a report indicating a change in interface to a new network interface to an upper layer;

an interface manager for, upon receiving the report from the handoff manager, transmitting information on the new network interface; and a service module for, upon receiving the information on the new network interface from the interface manager, determining immediately a bandwidth of the new network interface, generating a message based on the determined bandwidth, and transmitting the generated message to the server.

2. The apparatus of claim 1, wherein the service module comprises:

a service manager for, upon receiving information on the new network interface from the interface manager, determining the bandwidth of the new network interface; and a service application layer for generating the message based on the determined bandwidth and transmitting the generated message to the server.

3. The apparatus of claim 2, wherein the service application layer is configured to transmit the message to the server through Real-time Transport Control Protocol (RTCP)/Real Time Streaming Protocol (RTSP).

4. The apparatus of claim 1, wherein the interface comprises at least one of:

a mobile communication network interface, a wireless local area network (WLAN) interface, and a broadband wireless access (BWA) network.

5. A system for changing network interfaces in a mobile terminal in a wireless communication system including a server for providing high-capacity data transmission service to the mobile terminal, and the mobile terminal for receiving data from the server and supporting various network interfaces, the system comprising:

the mobile terminal for, upon detecting handoff based on current network information received, transmitting a report indicating a change in interface to a new network interface to an upper layer, determining immediately a bandwidth of the new network interface, generating a message based on the determined bandwidth, and transmitting the generated message to the server; and the server for receiving the message generated based on the determined bandwidth from the mobile terminal, and transmitting data to the mobile terminal with a bandwidth suitable for the new network interface.

6. The system of claim 5, wherein the mobile terminal is configured to transmit the message to the server through Real-time Transport Control Protocol (RTCP)/Real Time Streaming Protocol (RTSP).

7. The system of claim 5, wherein the interface comprises at least one of:

a mobile communication network interface, a wireless local area network (WLAN) interface, and a broadband wireless access (BWA) network.

8. The system of claim 5, wherein the server is configured to transmit data to the mobile terminal with an average bandwidth suitable for the new network interface.

9. A method for changing network interfaces in a mobile terminal in a wireless communication system including a server for providing high-capacity data transmission service to the mobile terminal, and the mobile terminal for receiving data from the server and supporting various network interfaces, the method comprising the steps of:

upon detecting handoff based on current network information received, transmitting a report indicating a change in interface to a new network interface to an upper layer; and upon receiving information on the new network interface, determining immediately a bandwidth of the new network interface, generating a message based on the determined bandwidth, and transmitting the generated message to the server.

10. The method of claim 9, wherein the step of transmitting the message comprises the step of:

transmitting the message to the server through Real-time Transport Control Protocol (RTCP)/Real Time Streaming Protocol (RTSP).

11. The method of claim 9, wherein the interface comprises at least one of a mobile communication network interface, a wireless local area network (WLAN) interface, and a broadband wireless access (BWA) network.

* * * * *